United States Patent
Kasprzyk et al.

[11] Patent Number: 5,985,186
[45] Date of Patent: Nov. 16, 1999

[54] METHOD OF PREPARING TUBULAR CERAMIC ARTICLES

[75] Inventors: Martin R. Kasprzyk, Ransomville; Michael P. Dunn, Clarence Center, both of N.Y.

[73] Assignee: Gas Research Institute, Chicago, Ill.

[21] Appl. No.: 09/026,233

[22] Filed: Feb. 19, 1998

[51] Int. Cl.$^6$ .......................... C04B 35/573; C04B 35/80
[52] U.S. Cl. .................. 264/29.7; 264/635; 264/640; 264/643
[58] Field of Search .................. 264/29.7, 635, 264/640, 643

[56] References Cited

U.S. PATENT DOCUMENTS

| | | | |
|---|---|---|---|
| 2,938,807 | 5/1960 | Anderson | 264/29.1 |
| 3,947,550 | 3/1976 | Fitchman | 264/44 |
| 4,141,918 | 2/1979 | Laskow et al. | |
| 4,148,897 | 4/1979 | Oka et al. | |
| 4,238,433 | 12/1980 | Hillig et al. | |
| 4,240,835 | 12/1980 | Laskow et al. | |
| 4,265,843 | 5/1981 | Dias et al. | |
| 4,294,788 | 10/1981 | Laskow et al. | |
| 4,325,930 | 4/1982 | Vallet. | |
| 4,385,020 | 5/1983 | Morelock. | |
| 4,432,957 | 2/1984 | Gupta et al. | |
| 4,536,449 | 8/1985 | Kennedy et al. | |
| 4,597,923 | 7/1986 | Kennedy et al. | |
| 4,737,328 | 4/1988 | Morelock. | |
| 4,789,506 | 12/1988 | Kasprzyk. | |
| 4,810,442 | 3/1989 | Hillig et al. | |
| 4,917,941 | 4/1990 | Hillig et al. | |
| 4,963,301 | 10/1990 | Davis et al. | 264/29.7 |
| 5,015,540 | 5/1991 | Borom et al. | |
| 5,067,999 | 11/1991 | Streckert et al. | |
| 5,236,638 | 8/1993 | Schulten et al. | |
| 5,294,460 | 3/1994 | Tani et al. | |
| 5,338,576 | 8/1994 | Hanzawa et al. | |
| 5,407,503 | 4/1995 | Matsui et al. | |
| 5,418,011 | 5/1995 | Pollak. | |
| 5,433,902 | 7/1995 | Leyderman. | |
| 5,476,684 | 12/1995 | Smith. | |
| 5,523,133 | 6/1996 | Smith. | |
| 5,525,372 | 6/1996 | Sayles. | |
| 5,540,950 | 7/1996 | Izawa et al. | |
| 5,552,352 | 9/1996 | Brun et al. | |
| 5,580,834 | 12/1996 | Pfaff. | |
| 5,628,938 | 5/1997 | Sangeeta et al. | |
| 5,632,320 | 5/1997 | Atmur et al. | |
| 5,840,221 | 11/1998 | Lau et al. | 264/640 |

OTHER PUBLICATIONS

Copy of Abstract of U.S. Patent No. 4,120,731, dated Oct. 1978, Hillig.

*Primary Examiner*—James Derrington
*Attorney, Agent, or Firm*—Pauley Petersen Kinne & Fejer

[57] ABSTRACT

A method of making a ceramic tube of silicon and silicon carbide comprising the steps of covering a mandrel with carbon fiber material; infiltrating the carbon fiber material with a thermoset resin; curing the resin to render the carbon fiber material rigid and produce a green body; removing the mandrel to produce a free-standing body; treating the free standing body with graphite to fill voids and render the green body gas tight and infiltrating the green body with molten silicon to form a silicon and silicon carbide ceramic tube.

19 Claims, 1 Drawing Sheet

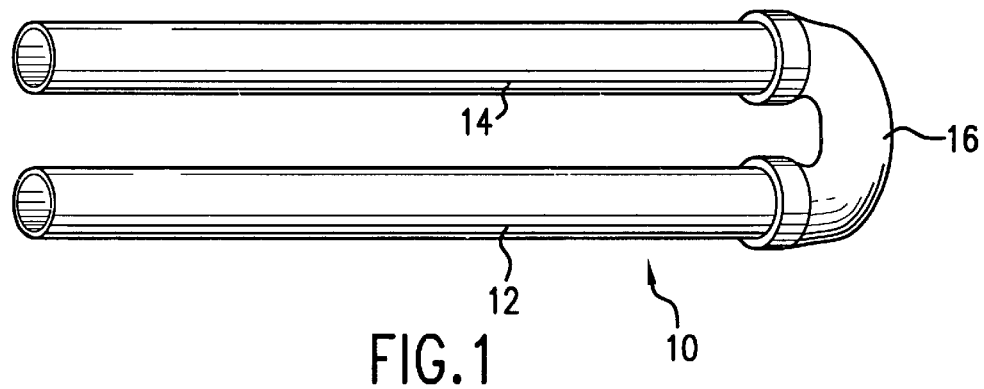
FIG.1
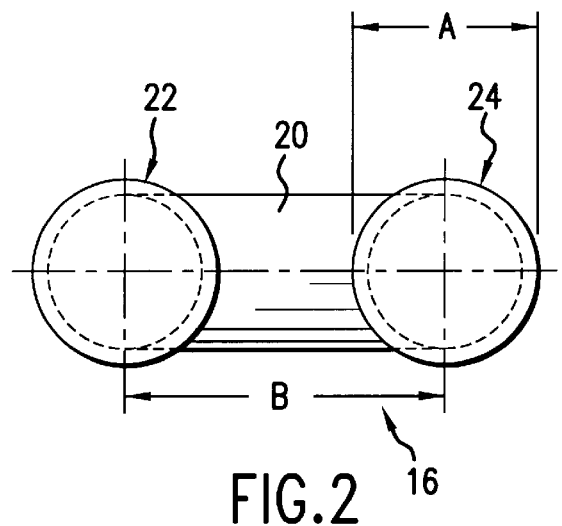
FIG.2
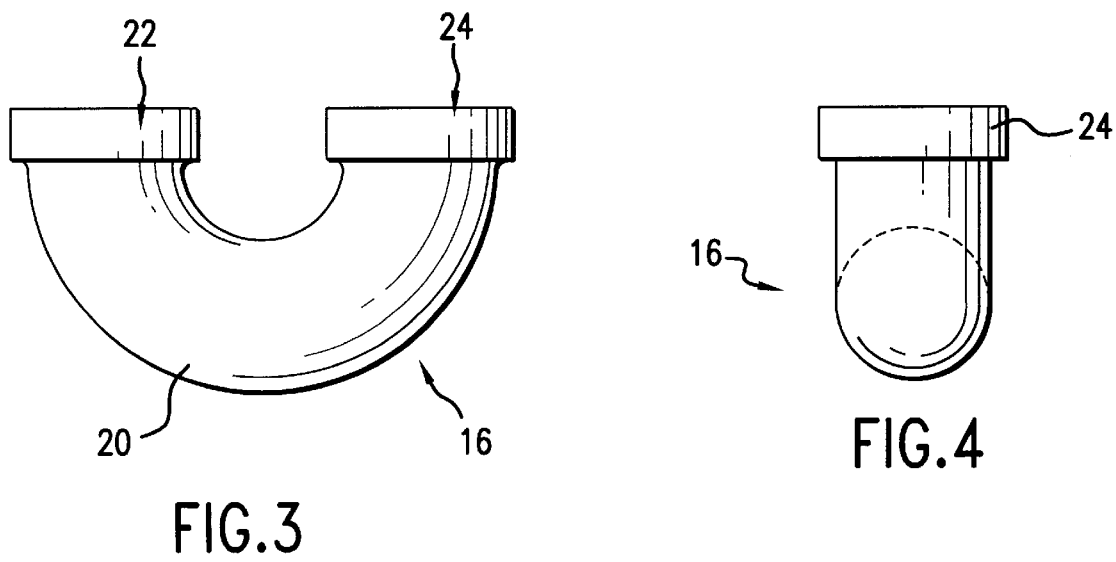
FIG.3
FIG.4

METHOD OF PREPARING TUBULAR CERAMIC ARTICLES

BACKGROUND OF THE INVENTION

This invention relates generally to tubular ceramic articles and, more particularly, to tubular ceramic articles comprised of silicon and silicon carbide.

Radiant burner tubes are used in high temperature, corrosive environments such as found in gas fired industrial heat treating furnaces and aluminum melting furnaces. Commercially available radiant burner tubes include metal alloy (e.g., nickel-chromium-based alloy) tubes, ceramic composite (e.g., oxide ceramic fibers in a silicon carbide ceramic matrix) tubes, and ceramic (e.g., silicon carbide) monolith tubes. Such tubes typically have an upper use temperature in a range of about 1100° C. (2012° F.) for metal alloy tubes, to about 1260° C. (2300° F.) for ceramic composite tubes to about 1350° C. (2462° F.) for silicon carbide monolithic tubes.

Although monolithic silicon carbide radiant burner tubes are available, such tubes are typically very expensive.

Through the taking of great care and by making some compromises in properties it may be possible to select a ceramic composite from which to prepare a radiant burner tube which generally meets most, but not necessarily all, of the requirements for use in high temperature, chemically corrosive environments.

Silicon carbide, a crystalline compound of silicon and carbon, has long been known for its hardness, strength, and generally excellent resistance to oxidation and corrosion. Silicon carbide has a low coefficient of expansion, good heat transfer properties and exhibits high strength and excellent creep resistance at elevated temperatures. These desirable properties may be attributed to strong covalent bonding. However, such strong bonding may also be the cause of a generally undesirable property of silicon carbide of being difficult to work or fabricate into particular useful shapes. For example, because at high temperatures silicon carbide dissociates rather than melts, it is not generally feasible to fabricate articles from silicon carbide by melt processing. Also, because silicon carbide has a relatively very slow diffusion rate, fabrication of such articles by plastic deformation processes is generally not viable.

It has been proposed to produce shaped silicon carbide articles by forming bodies of silicon carbide particles and either bonding or sintering the particles at high temperatures to form a consolidated body. If the particulate silicon carbide starting material is fine enough, and suitable sintering aids are added, the fine, particulate material will exhibit sufficient self-diffusion at high temperatures that the particulate material will sinter and form into a substantially dense single phase material. Sintering processes, in general, require fine powder starting materials and pressureless sintering processes, in particular, require an even finer starting material. Because of the needed fineness and high purity of the starting materials, articles formed by sintering processes are relatively expensive.

Coarser and less pure silicon carbide powders are known to bond together at high temperatures. However, the resultant products have considerable porosity and for that reason are usually not as strong, or as corrosion resistant, as more fully densified materials. The properties of such materials may be substantially improved by infiltrating the pores of such materials with silicon, in either vapor or liquid form, to produce a two phase, silicon-silicon carbide product. Although such processes utilize relatively inexpensive coarse powders as starting materials, they require two high temperature treatments such as in a furnace, one to form the silicon carbide to silicon carbide bond and a second, separate high temperature treatment, to infiltrate the formed body with silicon.

Mixtures of coarser and less pure silicon carbide powders with particulate carbon or with a carbon source material may be preformed and subsequently impregnated with silicon at high temperature to form "reaction bonded" or "reaction sintered" silicon carbide products. The carbon component may be in the form of particulate graphite or amorphous carbon, or may be in the form of a carbon source material, for example a carbonizable organic material, such as pitch, resin or similar materials, which will decompose during furnacing to yield carbon. The infiltrating silicon reacts with the carbon in the preformed body to form additional silicon carbide which bonds with the original silicon carbide particles to produce a dense silicon carbide article. Typically reaction bonded silicon carbide materials are characterized by almost zero porosity and the presence of a second phase, or residual, of silicon, usually greater than about 8% by volume.

In typical siliciding or typical reaction bonding processes, the particulate silicon carbide and carbon starting material is initially preformed or preshaped into an article, commonly referred to as a "green body", which is subsequently fired. The particulate silicon carbide and carbon starting mixture is commonly blended with a binder to aid in shaping. If the binder is dry, or relatively dry, the powder may be compacted to the desired shaped green body such as by using a press. If the binder is liquid, or semi-liquid, and is used in sufficient quantity, the mixture may suitably be slip cast, extruded or injection molded to form a shaped green body.

High temperature heat exchange components desirably have relatively thin walls to facilitate high rates of heat transfer. In general, previous techniques for fabricating tubular articles of silicon carbide have generally met with varying degrees of success.

One previously disclosed technique is the subject of commonly assigned Kasprzyk, U.S. Pat. No. 4,789,506, issued Dec. 6, 1988. In accordance therewith, a tubular article of silicon carbide and silicon is produced by concentrically positioning a vertical tubular column particulate silicon contiguous to a hollow, vertical tubular column of particulate silicon carbide, carbon, or mixtures of silicon and carbon, and heating the adjacent columns to a siliciding temperature. The silicon component infiltrates the column containing the particulate silicon carbide, carbon, or mixtures thereof, to form the tubular article.

While such a technique generally works well in producing straight tubular articles, such a technique is generally not well suited for producing arcuate tubular ceramic articles or ceramic tubular articles having arcuate sections or portions.

Consequently, arcuate tubular ceramic articles are generally formed by an alternative technique, such as by slip casting, for example. Unfortunately, such processing can be relatively slow and may also be either or both equipment and labor intensive. For example, such processing typically requires the use of various mixing and molding equipment and the labor associated therewith. As will be appreciated, such processing generally requires a large supply of plaster molds to permit the fabrication of a particular article in typical commercial production quantities. Further, such processing typically requires the use of various pieces of equipment such as mixing mills, vacuum deairing chambers and drying ovens as well as correspondingly large areas of floor space. Consequently, such processing can be more costly and time consuming than is desired or preferred.

In the past, mandrels have been used to make tubular articles. Rigid tubular articles have been made by placing the material that will form the tubular article about the mandrel and then hardening the material to a rigid state. After the tubular article has become rigid, the mandrel is removed from the interior thereof.

The removal of a mandrel from a tubular article having a simple shape is generally easily accomplished by sliding the mandrel out from the interior of the tubular article. For instance, for a tubular article having a straight, as opposed to a curved or bent shape, the corresponding mandrel is generally easily removed by simply sliding the mandrel out from the interior of the tubular article.

Conventional mandrels come in one piece and have an outer shape that generally corresponds to the shape of the interior of the tubular article being produced. In the past, it has been difficult to form rigid tubular articles in more complex forms, such as forms including both a straight portion and an arcuate portion, through the use of a single conventional mandrel. In practice, the fabrication of such tubular articles has necessitated the use of more than one mandrel: one mandrel is used to form the straight portion and a second mandrel is used to form the arcuate portion. These individual tubular segments formed from each of the separate mandrels are subsequently joined together to form the desired final tubular product.

SUMMARY OF THE INVENTION

A general object of the invention is to provide an improved method of making ceramic tubes.

A more specific objective of the invention is to overcome one or more of the problems described above.

The general object of the invention can be attained, at least in part, through a method of making a ceramic tube of silicon and silicon carbide. In accordance with one embodiment of the invention, such a method involves covering a mandrel with at least one layer of a carbon fiber material. The carbon fiber material covering is subsequently infiltrated with a thermoset resin. The resin-infiltrated covering is cured to render the covering rigid and maintain the covering in a rigid state, forming a mandrel-supported green body. The mandrel is subsequently removed from the green body to form a free-standing green body which is treated with graphite to fill voids in the carbon fiber material to render the graphite treated free-standing green body gas tight. The graphite treated free-standing green body is subsequently infiltrated with molten silicon to form a hollow ceramic tube comprised of silicon and silicon carbide.

The prior art fails to provide a method of making a ceramic tube of silicon and silicon carbide, particularly such a ceramic tube having an arcuate portion, which method is as simple and less costly as desired.

The invention further comprehends a method of making a U-shaped gas fired radiant tube assembly return bend comprised of silicon and silicon carbide and having an arcuate portion and at least one straight portion. In accordance with one embodiment of the invention, such a method includes the step of covering a flexible aluminum hose mandrel with at least one layer of a carbon fiber material. The carbon fiber material covered mandrel is shaped to a U-shape form having an arcuate portion and at least one straight portion. The shaped carbon fiber material covering is subsequently infiltrated with phenolic resin powder. The resin-infiltrated shaped covering is cured to render the covering rigid and maintain the covering in a rigid state, forming a mandrel-supported U-shaped green body. The aluminum hose mandrel is subsequently removed from the U-shaped green body to form a tubular U-shaped free-standing green body. Graphite paint is applied to the tubular U-shaped free-standing green body to fill voids in the carbon fiber material to render the painted free-standing green body gas tight. The graphite painted tubular U-shaped free-standing green body is subsequently infiltrated with molten silicon at a temperature in the range of 1500° C. to 1700° C. to react with the graphite particles and carbon fibers to form a U-shaped hollow ceramic tube having an arcuate portion and at least one straight portion and comprising silicon carbide in a matrix of silicon.

As used herein, references to an object, structure or the like as being "gas tight" or "substantially leak-free" are to be understood to refer to the specified object or structure as being constructed such as to prevent or avoid the transport or passage of gas therethrough in a quantity or rate significant for a particular or specified application, such as in radiant tube assembly such as used in industrial heat treating furnaces, for example. Heat treating furnaces are frequently used to add carbon or nitrogen to the surfaces of steel parts to make the parts harder and more wear resistant. These furnaces commonly use carefully controlled atmospheres rich in carbon monoxide or dissociated ammonia which act as carbon and nitrogen sources, respectively. Combustion products produced from the combustion of natural gas with air and passed through such radiant tube assemblies, however, typically include carbon dioxide and water vapor. As carbon dioxide and water vapor can interfere with the desired absorption of carbon and nitrogen into the steel parts, it is important that such radiant tube assemblies do not leak gas combustion products into the furnace atmosphere.

Other objects and advantages will be apparent to those skilled in the art from the following detailed description taken in conjunction with the appended claims and drawings.

BRIEF DESCRIPTION OF THE DRAWINGS

FIG. 1 a simplified perspective view of a radiant U tube assembly including a return bend made in accordance with one embodiment of the invention.

FIGS. 2–4 are top, side and end views, respectively, of the return bend of the radiant U tube assembly shown in FIG. 1.

DETAILED DESCRIPTION OF THE INVENTION

FIG. 1 illustrates a radiant U tube assembly, generally designated by the reference numeral 10. The radiant U tube assembly 10 includes first and second straight tube Si-SiC composite legs 12 and 14, respectively, and a Si-SiC composite return bend 16 made in accordance with one embodiment of the invention and described in greater detail below with reference to FIGS. 2–4.

As shown in FIGS. 2–4, the return bend 16 includes an arcuate body portion 20 and opposed first and second flared joint end portions 22 and 24, respectively. In practice, a return bend having an inside diameter (designated "A") of four (4) inches and a center to center distance (designated "B") of eight (8) or nine (9) inches is common. In the illustrated embodiment, the joint ends 22 and 24 each are composed of a straight portion 26 and 30, respectively. Such joint end portions 22 and 24 are adapted for mating joinder with respective assembly legs 12 and 14 such as is well known in the art. For example, the end of an assembly leg can be inserted into a respective flared joint end portion and secured therewith by means of the application of a high temperature refractory cement or the like to fill any remaining open space between the assembly leg and the associated flared joint end portion.

In accordance with one embodiment of the invention, such a return bend is made by covering or wrapping a mandrel with one or more layers of a carbon fiber material. While mandrels composed of various materials are contemplated, in accordance with one preferred embodiment of the invention, a mandrel composed of a relatively inexpensive flexible aluminum hose, such as available from various suppliers including Oatey Co. of Cleveland, Ohio, is utilized. Such an aluminum hose is generally constructed as a spiral coil of a narrow strip of aluminum foil material, with the coiled strip forming folded joints by overlapping edge width portions of the strip material. As will be described in greater detail below, the use of such a formed mandrel material can desirably facilitate the subsequent later desired removal of the mandrel.

The flared joint end portions 22 and 24 of the return bend 16 are of enlarged internal and external diameter. In accordance with one embodiment of the invention, such enlarged joint end portions can be shaped and formed by wrapping the aluminum hose mandrel with a narrow strip of thin aluminum sheet metal to build-up the mandrel to a desired thickness. Such an aluminum sheet metal wrapping can be secured to the aluminum hose mandrel by various techniques such as known to those skilled in the art. In practice, such a build-up formed of aluminum sheet metal wrapping can be secured in place by means of one or more sections or portions of masking tape. It will be appreciated that the carbon fiber wrap material will generally conform to these larger diameter mandrel end portions.

It will be appreciated that the carbon fiber wrap material can take various forms. For example, in accordance with one preferred embodiment of the invention, a carbon fiber wrap material composed of one or more layers of a braided carbon fiber tubular sleeve such as 4 inch ID 12k filament yarn carbon fiber braided sleeve such as available from Fiber Materials, Inc. of Biddeford, Me. is used. In the alternative, if desired, a generally less costly carbon fiber wrap material such as composed of carbon fiber cloth can be used. For example, a carbon fiber cloth such as 8 harness satin weave carbon fiber cloth such as available from Polycarbon, Inc. of Valencia, Calif. can be used. With the use of such a carbon cloth, loose end edges of the cloth can, if desired, be simply tightly glued in desired place or position by application of an appropriate contact cement which, for example, can be sprayed onto such an appropriately placed or positioned cloth.

In accordance with the invention, the carbon fiber material covered mandrel retains sufficient freedom of flexibility to then be shaped to form the desired U-shape.

The shaped carbon fiber material covered mandrel is subsequently treated with a thermosetting resin, such that the shaped carbon fiber material is infiltrated with the thermosetting resin. The resin is then cured such as by heating the resin-infiltrated shaped carbon fiber material to render the covering rigid and to maintain the rigid covering in a rigid state, forming a U-shaped green body.

It will be appreciated that in accordance with the invention, various resin materials can be used such that upon cure, the resin renders the covering rigid and will maintain the covering in such a desired formed or rigid state. Typically, thermosetting resins suitable for use in the practice of the invention include organic-based resins compatible with the method described herein for making an article of the invention and which resin is capable of being carbonized.

In turn, the method or technique by which the resin material is applied to the covering will generally correspondingly vary.

For example, in accordance with one preferred embodiment of the invention, a powdered phenolic resin is applied to the shaped carbon fiber material covering. As used herein, the term "phenolic resin" generally describes a wide variety of resin products which result from the reaction product of phenols with aldehydes. The application of such a powdered phenolic resin can take the form of dusting the shaped carbon fiber material covering with a loose fine powdered phenolic resin. The so dusted covering can then be preferably lightly tapped to better ensure penetration of the resin particles into the carbon fiber yarn structure. It will be appreciated that the utilization of such a fine powder will typically facilitate entry and penetration of the resin in interstices in the carbon fiber structure and the consequent rendering and maintaining of the treated structure in a desired rigid shape or form. The use of a fine powder (such as having particles of generally less than about 40 microns in diameter) such as to better ensure penetration of the resin in the carbon fiber yarn structure can typically be advantageous and thus desired.

If desired, a liquid form of thermosetting resin, such as a furan resin or a solid resin dissolved in an appropriate solvent such as an alcohol or acetone, can be used. While such solvent-containing liquids can facilitate application of the resin to the shaped carbon fiber material, they raise possible handling concerns and thus may not be preferred for use in the practice of the invention.

The resin-infiltrated shaped covering is then cured to render the covering rigid and maintain the covering in a rigid state, forming a mandrel supported U-shaped green body. For example, a phenolic resin infiltrated shaped covering can be placed in an oven heated to 450° F. for about 15 minutes to effect cure of the resin which in turn renders the treated carbon fibers of the covering rigid.

After being allowed to cool to an appropriate temperature, the mandrel is removed from the mandrel supported green body to form a tubular U-shaped free-standing green body. In a preferred practice of the invention, such removal is facilitated by the above-described use of a mandrel composed of an aluminum hose generally constructed as a spiral coil of a narrow strip of aluminum foil material, with such coiled strip forming folded joints by overlapping end width portions of the strip material. More specifically, such an aluminum hose can generally be simply removed by simply bending the hose to secure a free edge of the aluminum foil strip and subsequently unraveling the coiled strip. It will be appreciated that such an aluminum hose construction is generally similar to the coiled strip packaging construction commonly used for items such as refrigerated biscuits and the like.

Any build-up of aluminum sheet metal wrapping such as at the end portions 22 and 24 can also be subsequently easily removed such as by the simple means of securing a free inner edge of the wrapping and effecting an unraveling of wrapping build-up.

The tubular U-shaped free-standing green body is subsequently treated with graphite. In one preferred form of the invention, such treatment simply takes the form of painting the free-standing green body with one or more coats of a graphite paint, such as grade AE graphite paint available from Dylon Industries Inc. of Cleveland, Ohio, sufficient to ensure that the return bend is rendered gas tight or substantially leak-free.

The graphite treated tubular U-shaped free-standing green body is subsequently infiltrated with molten silicon in an inert atmosphere or vacuum. Suitable inert atmospheres include argon or helium. Atmospheres that react with molten silicon, such as oxygen, are preferably generally avoided. Infiltration generally cannot be carried out in air because the molten silicon will generally oxidize under such conditions, forming a dense silica coating prior to the occurring of any significant infusion by the silicon. Vacuums achieved by removing air from a chamber are generally suitable if the air pressure is reduced to below about 40 Torr.

Such infiltration is preferably conducted at a temperature in the range at which silicon is in liquid form. That is, the temperature is preferably between the melting point and the vaporization temperature of silicon, typically in the range of between about 1410° C. and about 2000° C. More preferably, such infiltration is conducted at a temperature of greater than about 1500° C., so as to better assure that the silicon is in molten form, and no more than about 1700° C., to minimize heating requirements.

With such infiltration, carbon fibers and particles of graphite resulting from the paint react with the molten silicon to form silicon carbide fibers and particles. The molten silicon also serves to fill in the green body form so that the final material is preferably a two phase silicon carbide-silicon composite material of silicon carbide fibers and particles in a matrix of silicon.

While the invention has been described above with specific reference to the return bend portion of the U tube assembly 10, it will be appreciated that the invention in its broader application is not so limited. For example, if desired, one or more of the legs of the assembly can alternatively or also be fabricated in accordance with the invention. Further, it is to be appreciated that one or both of the legs of such an assembly can, if desired, be fabricated in one continuous piece with the return bend. With such one piece construction, assembly can be facilitated and the need for joinder of separate pieces and the risk of undesired leakage through such joinder can be minimized or eliminated.

Further, it will be understood that the invention is not necessarily limited to the making of ceramic tubes of silicon and silicon carbide for radiant U tube assemblies. It will be appreciated that ceramic tubes in accordance with the invention can find various alternative uses and applications, as will be apparent to those skilled in the art.

The present invention is described in further detail in connection with the following example which illustrates or simulates various aspects involved in the practice of the invention. It is to be understood that all changes that come within the spirit of the invention are desired to be protected and thus the invention is not to be construed as limited by this example.

EXAMPLE

A silicon infiltrated carbon braid return bend was made and tested in accordance with the following procedures:

Both ends of a 24 inch length of straight flexible 4.0 inch outside diameter aluminum hose were wrapped with a 2.5 inch wide strip of 0.010 inch thick aluminum sheet metal to build-up an increased outside diameter section of 4.75 inches, forming a return bend mandrel. The wraps of aluminum strip were held in place with masking tape to prevent the wraps from unraveling. A first 24 inch length section of a 4 inch diameter 12k filament yarn carbon fiber braided tubular sleeve was slid over the mandrel and the ends of the sleeve were taped to the aluminum hose to hold the sleeve in place. A second 24 inch length of carbon fiber braided tubular sleeve was slid over the first sleeve of the assembly. The second sleeve was also taped at its ends to the aluminum hose. The carbon fiber braided sleeves closely conformed to the surface of the mandrel so that the ends of the assembly had flared, increased diameter sections 2.5 inches long where the aluminum strip wrappings had been placed.

The braided carbon fiber sleeve covered mandrel was bent in a half circle shape with a bend radius of 4 inches. The shaped covered mandrel was dusted with a light coating of dry powdered phenolic resin grade 2902 made by the Durez Division of the Occidental Chemical Corp. The resin-infiltrated assembly was placed in an oven at 450° F. for 15 minutes to set the resin. The assembly was removed from the oven and allowed to cool to room temperature, forming a mandrel-supported green body.

The mandrel was then removed by first removing the aluminum hose by unraveling the hose from one end. The aluminum metal strip was then also removed by being unraveled from the inside of the carbon fiber return bend resulting in the return bend having an inside diameter of 4.0 inches for most of its length except for the ends, which each had an inside diameter of 4.75 inches.

The outside surface of free-standing green body return bend was painted with a coating of water-based graphite grade AE paint made by Dylon Industries Inc. and the graphite paint was allowed to air dry. The painting and drying steps were subsequently twice repeated. The graphite paint filled spaces between the carbon fiber yarns in the braided tubes to form a return bend with no visible small holes.

A 24 inch length of 3 inch outside diameter aluminum hose was then bent in a half circle shape with a bend radius of 4 inches and inserted into the braided carbon fiber return bend. The annular space between the aluminum hose insert and the return bend was filled with a "cover mixture" consisting of a loose dry mixture of 5% 2902 phenolic resin, 5% grade 9018 from Superior Graphite, Inc. and 90% −30+80 mesh silicon metal grain from Globe Metallurgical, Inc. The assembly was placed in an oven at 450° F. for 30 minutes to set the resin in the cover mixture, making the cover mixture rigid. The return bend was cooled and the aluminum hose insert was removed by unraveling it. The resultant return bend had a 0.5 inch thick layer of cover mixture covering its entire internal surface.

The braided carbon fiber return bend was then placed in a vertical closed bottom cylindrical graphite crucible susceptor made from grade HLM graphite by Weaver Industries, Inc. and having an inside diameter of 9.25 inches, an inside height of 16.25 inches and a wall thickness of 0.31 inches. A graphite lid was placed in sealing relationship on the top of the crucible. The crucible was centrally placed in a vertical quartz tube furnace having an inside diameter of 12.25 inches and the space between the crucible and the furnace wall was filled with −20+50 mesh hollow spherical aluminum ball insulation material made by Washington Mills, Inc. The quartz furnace tube was sealed with an aluminum plate and air was removed from the furnace with a vacuum pump to achieve a vacuum of 10 Torr. The graphite crucible was induction heated with a 17 inch long, 13 turn induction coil placed around the outside of the quartz furnace tube. Power to the coil was supplied by a 30KW Lepel high frequency power supply operated at full output. The heating cycle lasted 45 minutes and a peak firing temperature of 1700° C. was obtained.

After cooling, the return bend was removed from the furnace and the inside of the return bend had a sponge like coating of friable excess silicon metal which was easily removed from the return bend which had been fully infiltrated by molten silicon during the firing. Small mounts of excess silicon on the outside surface of the return bend was removed by diamond wheel grinding.

The silicon infiltrated carbon fiber return bend was then joined together with two 4.5 inch outside diameter straight Inex Si-SiC tubes. The straight tubes were inserted into the flared ends of the return bend and, while held in centered position, open gaps between the outside surface of the straight tubes and the adjacent flared ends of the return bend were filled with Sauereisen No. 8 cement which had a thick paste consistency. After being allowed to cure for a period of one day, the U tube assembly was forwarded for burner testing.

Testing of the radiant U tube consisted of firing the radiant tube with natural gas to heat the furnace to a temperature of 1800° F. over a period of one day. The furnace was then cycled four times per day between 1200° F. and 1800° F. for three days. The cooling portion of the cycles was accomplished by blowing cold air through the tubes. This was a severe test for thermal shock resistance to determine if the return bend assembly could withstand sudden temperature changes. The furnace was then allowed to cool for a period of one day. The radiant tube assembly was then inspected for damage and none was found. Some minor gas leakage was observed at the cemented joint between the return bend and the straight tube legs during room temperature soap bubble leak testing, some minor gas leakage was observed at the cemented joint between the return bend and the straight tube legs, but the rate of leakage was insignificant.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A method of making a ceramic tube comprised of silicon and silicon carbide, said method comprising the steps of:
   covering a mandrel with at least one layer of a carbon fiber material;
   infiltrating the carbon fiber material covering with a thermoset resin;
   curing the resin-infiltrated covering to render the covering rigid and maintain the covering in a rigid state, forming a mandrel-supported green body;
   removing the mandrel from the green body to form a free-standing green body;
   treating the free-standing green body with graphite to fill voids in the carbon fiber material to render the graphite treated free-standing green body gas tight; and
   infiltrating the graphite treated free-standing green body with molten silicon to form a hollow ceramic tube comprised of silicon and silicon carbide.

2. The method of claim 1 wherein the mandrel comprises an aluminum hose.

3. The method of claim 1 wherein the mandrel comprises a hose constructed as a spiral coil of a narrow strip of aluminum foil material and having end width portions of the strip material overlap to form folded joints.

4. The method of claim 3 wherein said step of removing the mandrel from the green body comprises the step of unraveling the aluminum foil spiral coil.

5. The method of claim 1 wherein the carbon fiber material comprises a braided carbon fiber sleeve.

6. The method of claim 1 wherein the carbon fiber material comprises carbon fiber cloth.

7. The method of claim 1 wherein the thermoset resin comprises an organic-based resin capable of being carbonized.

8. The method of claim 1 wherein the thermoset resin comprises a phenolic resin.

9. The method of claim 1 wherein the thermoset resin is applied in the form of a powder to the carbon fiber material covering.

10. The method of claim 1 wherein the thermoset resin comprises a phenolic resin applied to the carbon fiber material in the form of a powder of particles less than about 40 microns in diameter.

11. The method of claim 1 wherein said step of treating the free-standing green body with graphite comprises applying graphite paint to the free-standing green body to fill voids in the carbon fiber material to render the painted free-standing green body gas tight.

12. The method of claim 1 wherein said step of infiltrating the graphite treated free-standing green body with molten silicon comprises processing in an inert atmosphere at a temperature in the range of about 1410° C. to about 2000° C.

13. The method of claim 12 wherein the processing temperature is in the range of about 1500° C. to about 1700° C.

14. A method of making a U-shaped gas fired radiant tube assembly return bend comprised of silicon and silicon carbide, the U-shaped return bend having an arcuate portion and at least one straight portion, said method comprising the steps of:
   covering a flexible aluminum hose mandrel with at least one layer of a carbon fiber material;
   shaping the carbon fiber material covered mandrel to a U-shape having an arcuate portion and at least one straight portion;
   infiltrating the shaped carbon fiber material covering with phenolic resin powder;
   curing the resin-infiltrated shaped covering to render the covering rigid and maintain the covering in a rigid state, forming a mandrel-supported U-shaped green body;
   removing the aluminum hose mandrel from the U-shaped green body to form a tubular U-shaped free-standing green body;
   applying graphite paint to the tubular U-shaped free-standing green body to fill voids in the carbon fiber material to render the painted free-standing green body gas tight;
   infiltrating the graphite painted tubular U-shaped free-standing green body with molten silicon at a temperature in the range of 1500° C. to 1700° C. to react graphite particles with carbon fibers to form a U-shaped hollow ceramic tube having an arcuate portion and at least one straight portion and comprising silicon carbide in a matrix of silicon.

15. The method of claim 14 wherein the flexible aluminum hose mandrel comprises a hose constructed as a spiral coil of a narrow strip of aluminum foil material and having end width portions of the strip material overlap to form folded joints, wherein said step of removing the mandrel from the U-shaped green body comprises the step of unraveling the aluminum foil spiral coil.

16. The method of claim 14 wherein the carbon fiber material comprises a braided carbon fiber sleeve.

17. The method of claim 14 wherein the carbon fiber material comprises carbon fiber cloth.

18. The method of claim 14 wherein the phenolic resin powder applied to the carbon fiber material is in the form of a powder of particles less than about 40 microns in diameter.

19. The method of claim 14 wherein said step of infiltrating the graphite painted tubular U-shaped free-standing green body with molten silicon at a temperature in the range of 1500° C. to 1700° C. is conducted in an inert atmosphere.

* * * * *